United States Patent [19]

Saitoh et al.

[11] Patent Number: 4,953,025
[45] Date of Patent: Aug. 28, 1990

[54] APPARATUS FOR DEFINING AN EFFECTIVE PICTURE AREA OF A HIGH DEFINITION VIDEO SIGNAL WHEN DISPLAYED ON A SCREEN WITH A DIFFERENT ASPECT RATIO

[75] Inventors: Mitsumasa Saitoh, Kanagawa; Seiichi Ogawa, Tokyo; Miyuki Yamane, Tokyo; Hideki Fukasawa, Kanagawa, all of Japan

[73] Assignee: Sony Corporation, Tokyo, Japan

[21] Appl. No.: 352,931

[22] Filed: May 17, 1989

[30] Foreign Application Priority Data

May 20, 1988 [JP] Japan .................... 63-121696

[51] Int. Cl.$^5$ .............................. H04N 7/01
[52] U.S. Cl. ...................... 358/140; 358/230
[58] Field of Search ............ 358/140, 11, 12, 22, 358/230

[56] References Cited

U.S. PATENT DOCUMENTS

| | | | |
|---|---|---|---|
| 4,172,264 | 10/1979 | Taylor | 358/22 |
| 4,223,343 | 9/1980 | Belmares-Sarabia | 358/54 |
| 4,476,484 | 10/1984 | Haskell | 358/11 |
| 4,476,493 | 10/1984 | Poetsch | 358/214 |
| 4,513,324 | 4/1985 | Poetsch | 358/214 |
| 4,651,208 | 3/1987 | Rhodes | 358/140 |
| 4,654,696 | 3/1987 | Dayton | 358/11 |
| 4,730,215 | 3/1988 | Jose | 358/140 |

FOREIGN PATENT DOCUMENTS 2097220 10/1982 United Kingdom .
2140243 11/1984 United Kingdom .

OTHER PUBLICATIONS

Fernseh-Und Kino-Technik, vol. 42, No. 4, Apr. 1988, pp. 177–184, Heidelberg, DE; G. Holoch: "Aspekte der Normwandlung von HDTV in bestehende Fernsehstandards".

Primary Examiner—Howard W. Britton
Attorney, Agent, or Firm—Alvin Sinderbrand

[57] ABSTRACT

In an apparatus for converting received video signals of a first format, which has a first number of horizontal lines in a field or frame and a picture display of a first aspect ratio, to video signals of a second format, which has a second number of horizontal lines in a field or frame and a picture display of a second aspect ratio; an analog-to-digital converter converts the received video signals of the first format to digital video signals, a memory has addresses at which there are written at least a field of the digital video signals of the first format, whereupon, a reading circuit reads from the memory addresses less samples of the digital video signals than were written in the memory and the digital video signals thus read from the memory are converted back to analog form, and a controller is provided for variably determining a start address of the addresses in the memory from which video signal data are read. In the case where the first aspect ratio is larger than the second aspect ratio, the selection of the start address determines a portion or portions of the picture display of the first aspect ratio to be omitted at least at one side of the picture display of the second aspect ratio.

8 Claims, 3 Drawing Sheets

APPARATUS FOR DEFINING AN EFFECTIVE PICTURE AREA OF A HIGH DEFINITION VIDEO SIGNAL WHEN DISPLAYED ON A SCREEN WITH A DIFFERENT ASPECT RATIO

BACKGROUND OF THE INVENTION

1. Field of the Invention

This invention relates generally to a television receiver that can be used in connection with a so-called high definition television (HDTV) system, and more particularly is directed to an apparatus for converting video signals of a first format, for example, the HDTV format, to video signals of a second format, for example, that of the standard NTSC video signals.

2. Description of the Prior Art

In order to provide a higher resolution than that achieved with the existing standard television systems, a high definition television (HDTV) system has been developed in which the number of horizontal scanning lines in each field or frame is increased and the frequency band of the video signal is widened, and such high definition television system is now being perfected and made practical. Thus, for example, a standard NTSC television receiver employs 525 horizontal scanning lines and the frequency band of the NTSC luminance signal is 4.2 MHz, while the HDTV television receiver employs 1125 horizontal scanning lines and the HDTV luminance signal has a frequency band of 20 MHz.

Furthermore, although the aspect ratio of the picture screen of the existing standard NTSC television receiver, that is, the ratio of its horizontal dimension to its vertical dimension, is 4:3, the corresponding aspect ratio of the picture screen of the HDTV television receiver has been selected to be 16:9, or approximately 5:3. Therefore, even if a so-called scan-converter is employed for changing the number of the horizontal scanning lines in a received HDTV television signal to correspond with the 525 horizontal scanning lines used in the standard NTSC television receiver, the different aspect ratios of the picture displays according to the HDTV and NTSC formats give rise to problems in displaying the scan-converted HDTV video signal on the screen of a standard NTSC television monitor receiver.

As shown for example on FIG. 1A, in order to display, on the picture screen of an NTSC television monitor receiver represented in full lines and having the aspect ratio of 4:3, the full picture corresponding to an HDTV video signal intended to be displayed on the picture screen of an HDTV television receiver having an aspect ratio which, for the sake of simplicity, is assumed to be 5:3, as represented by the dotted lines on FIG. 1A, it has been proposed to subject the HDTV video signal to a picture conversion in which the time base of the video signal is compressed to 4/5th of its original value and the number of horizontal scanning lines is converted from 1125 to 525. However, when such previously proposed picture conversion is effected, the resulting displayed picture is vertically elongated as shown in FIG. 1A so that the displayed picture is unnatural or distorted.

On the other hand, if the HDTV video signal is subjected to a picture conversion in which, while the HDTV aspect ratio of 5:3 is maintained, the picture size is reduced so as to have a horizontal size no greater than that of the picture screen of an NTSC television monitor receiver on which the HDTV video signal is to be displayed, as shown on FIG. 1B, distortion of the picture is avoided, but upper and lower portions of the picture screen are left blank or black, as indicated by the shaded areas. Such blank or black upper and lower portions of the picture screen each correspond to approximately 1/10th the vertical dimension of the picture screen. Thus, of the 525 horizontal scanning lines of the standard NTSC television monitor or receiver, only about 450 horizontal scanning lines are used to form the effective picture area in FIG. 1B. Consequently, although the previously proposed arrangement illustrated in FIG. 1B avoids picture distortion, it does so at the expense of substantially degrading the enhanced vertical resolution which is one of the desirable features of the HDTV system.

In order to avoid both the picture distortion of FIG. 1A and the degraded vertical resolution of FIG. 1B, it has been proposed to display a HDTV video signal as a natural looking image, for example, as shown on FIG. 1C. In accordance with the proposal illustrated by FIG. 1C, left- and right-hand side portions of the picture that would be displayed on the picture screen of an HDTV television receiver, that is, a picture screen having an aspect ratio of 5:3 as shown in dotted lines on FIG. 1C, in response to an HDTV video signal, are omitted when such video signal is displayed on the picture screen of an NTSC television monitor receiver having an aspect ratio of 4:3, and which is represented in full lines on FIG. 1C. In this case, however, if the right- and left-hand side portions of the HDTV television picture contain important video information, such video information will be omitted from the picture displayed on the picture screen of the standard NTSC television monitor receiver and cannot be observed or displayed.

OBJECTS AND SUMMARY OF THE INVENTION

Accordingly, it is an object of this invention to provide an apparatus for converting received video signals of a first format, for example, the HDTV format, which has a first number of horizontal scan lines and a picture display of a first aspect ratio, to video signals of a second format, for example, the NTSC format, which has a second or different number of horizontal scan lines and a picture display of a different aspect ratio, and which avoids the above mentioned disadvantages or problems inherent in the proposals of the prior art.

More specifically, it is an object of this invention to provide an improved apparatus, as aforesaid, for defining an effective picture area of a HDTV video signal so as to make effective use of the video data contained therein when such HDTV video signal is displayed on the picture screen of an NTSC or other conventional television monitor receiver having an aspect ratio different from that of the picture display in the HDTV format.

Another object of this invention is to provide an apparatus, as aforesaid, for defining an effective picture area of an HDTV video signal which is displayed on the picture screen of a television monitor receiver having an aspect ratio different from that of the picture display in the HDTV format, and in which the portion or portions of the picture area not displayed by reason of the difference in aspect ratios may be varied for ensuring the display of all important video information at any time.

Still another object of this invention is to provide an apparatus, as aforesaid, in which the portion of the HDTV video signal which is displayed is, at all times, free of distortion, and further in which degradation of the vertical resolution is avoided beyond that inherent in the reduction of the number of horizontal scanning lines of the HDTV video signal to the number characteristic of the NTSC or other conventional television monitor receiver on which the picture is displayed.

According to an aspect of the present invention, an apparatus for converting video signals of a first format, which has a first number of horizontal scanning lines in a field and a picture display of a first aspect ratio, to video signals of a second format, which has a second number of horizontal scanning lines in a field and a picture display of a second aspect ratio, comprises: means for receiving video signals of the first format, analog-to-digital converter means for converting the video signals of the first format to digital video signals, memory means having addresses capable of storing at least a field of the digital video signals of the first format, means for writing the digital video signals at the addresses of the memory means, means for reading from the addresses of the memory means less samples of the digital video signals than have been written in the memory means, digital-to-analog converter means for converting the digital video signals read from the memory means into analog video signals of the second format, and controlling means for variably determining a start address of the addresses from which video signal data are read from the memory means. In the case where the first aspect ratio is larger than the second aspect ratio, the selection of the start address for reading from the memory means determines the portion or portions of the picture display of the first aspect ratio omitted at least at one side or both sides, respectively, of the picture display of the second aspect ratio. Thus, by varying such start address while observing the displayed picture, it is possible to ascertain whether the omitted portion or portions of the picture display of the first aspect ratio contains important video information.

The above, and other objects, features and advantages of the present invention, will be apparent in the following detailed description of an illustrative embodiment which is to be read in conjunction with the accompanying drawings, wherein the same reference numerals are employed to identify the same or similar elements.

DETAILED DESCRIPTION OF A PREFERRED EMBODIMENT

Figure 1A:
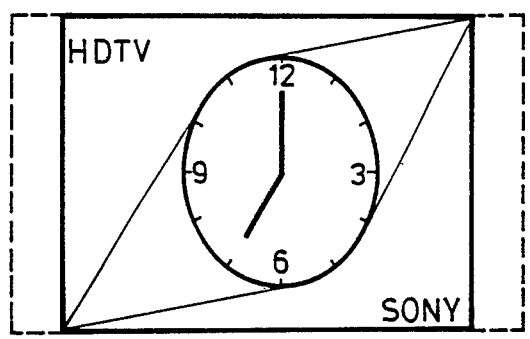
FIGS. 1A, 1B and 1C are schematic illustrations of the picture screens of television monitor receivers, and illustrate the types of picture displays provided by respective conversion systems of the prior art.
Figure 1B:
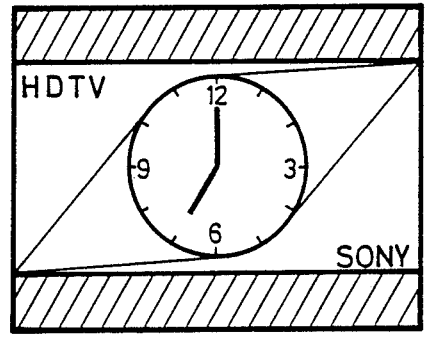
Figure 1C:
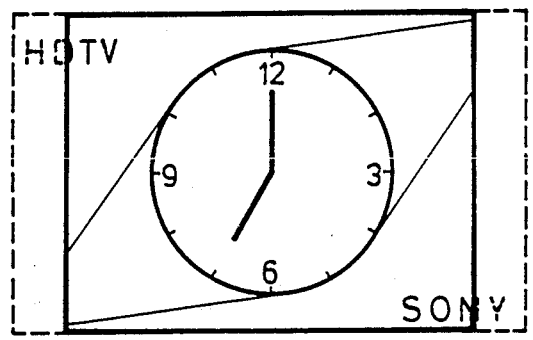
Figure 2:
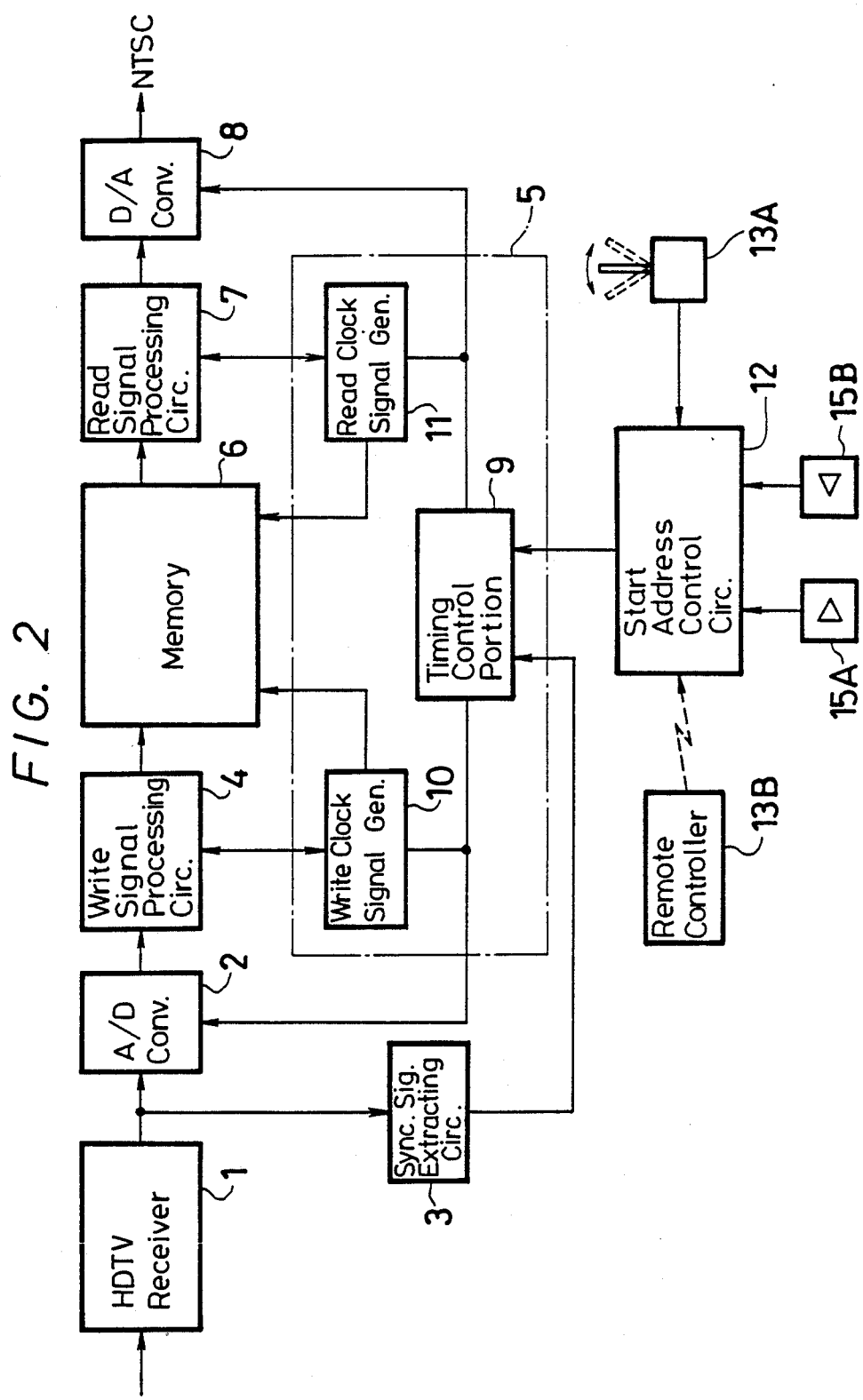
FIG. 2 is a block diagram showing an apparatus according to an embodiment of the present invention for defining an effective area of an HDTV video picture to be displayed on the picture screen of a television monitor receiver according to a different format.

As shown in FIG. 2, an apparatus according to an embodiment of this invention for converting an HDTV video signal to a video signal of an existing standard format, for example, an NTSC video signal, generally comprises an HDTV video signal receiving device 1, an analog-to-digital (A/D) converter 2, a synchronizing signal extracting circuit 3, a write signal processing circuit 4, a memory control circuit 5, a memory 6, a read signal processing circuit 7 and a digital-to-analog (D/A) converter 8.

The memory control circuit 5, which may be constituted by a microcomputer, is shown to include a timing control portion 9 generating control signals for the writing and reading of video data of one frame in and from the memory 6, a write clock signal generator 10 for generating a write clock signal under the control of the timing control portion 9, and a read clock signal generator 11 for generating a read clock signal under the control of the timing control portion 9.

A start address control circuit 12 is provided with a suitable connection to the timing control portion 9 for determining the start address of a read clock signal provided from the timing control portion 9 to the memory 6. Such start address control circuit 12 varies the start address of the read clock signal applied to the memory 6 in response to a picture position determining signal applied to the start address control circuit 12 by a manually actuable joy stick 13A or by a remote controller 13B.

The position of the picture displayed on the picture screen of a television monitor receiver can be further determined or varied by manual operation of picture position selecting buttons 15A and 15B of such television monitor receiver which are connected to the start address control circuit 12.

The above described apparatus shown in FIG. 2 operates as follows:

An HDTV television signal broadcast by a satellite and received at a suitable antenna (not shown), or received through a cable television (CATV) system, is converted to a video signal by the HDTV receiving device 1. Such HDTV video signal is supplied to the A/D converter 2 in which it is converted from its original analog form to a digital video signal. Synchronizing information contained in the video signal derived from the HDTV receiving device 1 is extracted by the synchronizing signal extracting circuit 3 and supplied from the latter to the timing control portion 9 of the memory control circuit 5. The video signal from HDTV receiving device 1 is sampled by the A/D converter 2 under the control of the timing control portion 9, for example, at a sampling frequency of 38.234 MHz, so as to provide 1134 samples for each horizontal line of the HDTV video signal which has 1125 horizontal lines per frame. The video data representing the effective picture area are sequentially stored or written by the write control signal processing circuit 4 in 1134 memory portions or addresses provided in the memory 6 for each of the 1125 horizontal lines included in a frame of the video signal of the HDTV system. Thus, the memory 6 has a capacity sufficient to store at least a frame of the HDTV video signal corresponding to a displayed picture having an aspect ratio, that is, a ratio of its horizontal dimension to its vertical dimension, of approximately 5:3.

In the example being described, that is, when the HDTV video signal having an aspect ratio of 5:3 is to be converted into a video signal for display on a picture screen having an aspect ratio of 4:3, the frequency of the read clock signal for the memory 6 is selected to be 14.318 MHz, which is $4 \times f_{sc}$, where $f_{sc}$ is the sub-carrier frequency of the NTSC system. With such read clock signal frequency of 14.318 MHz, 910 samples of video or image data are read from the memory 6 during each horizontal period of the NTSC system, that is, during each of the 525 horizontal scanning lines occurring during each of the 30 frames per second of the NTSC format. Thus, the number of video or image data or samples read from the memory 6 during each horizontal period is approximately equal to 4/5th (910/1134) the number of samples or image data written in the memory 6 during each horizontal period of the incoming HDTV signal, with the result that the horizontal dimension of the television picture is reduced to 4/5th of its original size. Accordingly, the aspect ratio 5:3 of the original HDTV picture display is changed to the aspect ratio 4:3 of the picture display according to the NTSC format.

Although 1125 horizontal lines are directly read out from the memory 6, such 1125 horizontal lines are converted to 525 horizontal lines forming one frame according to the NTSC format by the read signal processing circuit 7. Such conversion of the number of horizontal lines from the 1125 lines per frame of the HDTV system to the 525 lines per frame of the NTSC system can be effected in a well known manner, for example, by a so-called line interpolation method which is known for the conversion between the NTSC and PAL systems, or as is disclosed, for example, in Japanese Pat. Publication No. 59/104866.

In accordance with the line interpolation method, a vertical digital filter or the like is employed for forming 525 horizontal line signals from the 1125 horizontal line signals read from the memory 6, with the intervals between the resulting 525 horizontal line signals being as nearly equal to each other as is possible.

Accordingly, when the digital video signal derived from the read signal processing circuit 7 is converted to an analog signal by the D/A converter 8, the resulting video signal has 525 horizontal scanning lines per frame. Further, each such horizontal line contains video signal components corresponding to 910 of the 1134 samples of video or image data comprising each horizontal line of the HDTV video signal written in the memory 6. Upon the addition of horizontal and vertical synchronizing signals to the output from the D/A converter 8, there is derived from the apparatus embodying this invention video signals which can be applied to a conventional television monitor receiver for displaying thereon a picture having an aspect ratio of 4:3 which is characteristic of the NTSC system for which such conventional television monitor receiver is originally adapted.

It will be appreciated that, in reading out only 910 samples of the 1134 samples written in the memory 6 for each horizontal line of the HDTV video signal, the remaining 224 samples of each horizontal line of the HDTV video signal are not produced. In accordance with the present invention, the position or positions, in the horizontal direction, of the image data or samples which are not produced can be variably determined or selected by a signal derived from the start address control circuit 12. For example, if the picture position determining signal applied from circuit 12 to the timing control portion 9 of the memory control circuit 5 directs that the image data is to be read out from the address "0" in the memory 6 corresponding to the horizontal position on the picture indicated at a on FIG. 3A, then the image data which is not produced or read out from the memory 6 for each horizontal line will be the 224 samples constituting the right hand end portion of each horizontal line written in the memory 6. As a result of the foregoing, and as shown on FIG. 3A, a right-hand side portion $H_A$ corresponding, in the horizontal direction, to 224 image data samples, of the HDTV picture display having the aspect ratio of 5:3 is omitted from the picture actually displayed on the screen of the NTSC television monitor receiver having the aspect ratio of 4:3. In other words, the entire HDTV picture, with the exception of its right-hand side portion $H_A$, is without distortion displayed on the screen of the NTSC television monitor receiver.

In the previously described apparatus according to an embodiment of the present invention, the read start address determined by the circuit 12 can be selected to be anywhere in the range from "0" to "224" in response to suitable actuation of the joy stick 13A or the remote controller 13B. For example, if the read start address is selected to be "112" which corresponds to the position indicated at b on FIG. 3B, the picture displayed on the NTSC television monitor screen having the aspect ratio of 4:3 is substantially centered in respect to the HDTV picture display having the aspect ratio of 5:3. By reason of the foregoing, relatively narrow left-hand and right-hand side portions $H_{B1}$ and $H_{B2}$ of the HDTV picture are omitted from the picture display on the picture screen of the NTSC television monitor receiver.

Figure 3A:
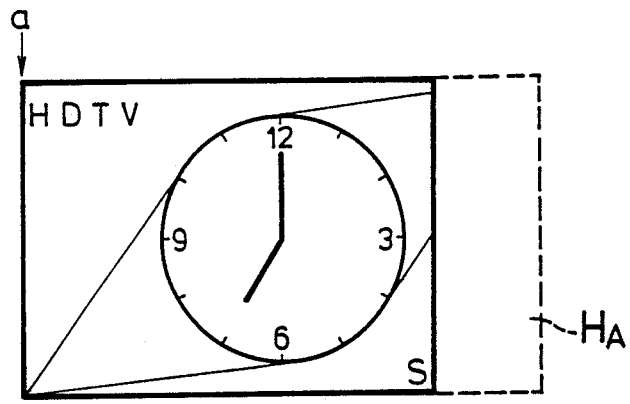
FIGS. 3A, 3B and 3C are schematic representations of the picture screen of a television monitor receiver, for example, of the NTSC format, when displaying different effective areas of HDTV video signals determined by the apparatus of FIG. 2.
Figure 3B:
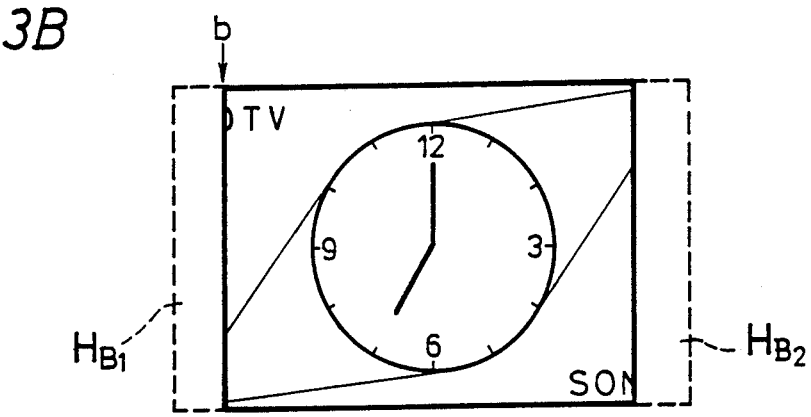
Figure 3C:
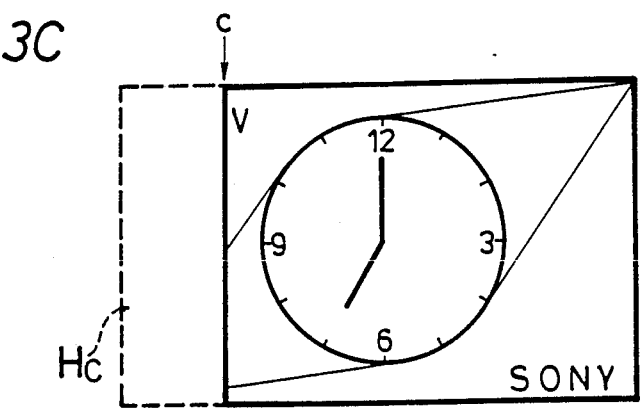

Furthermore, if the read start address is selected to be "224" which corresponds to the position indicated at c on FIG. 3C, only the left-hand side portion $H_C$ of the HDTV picture display is omitted from the picture displayed on the picture screen of the NTSC television monitor receiver.

Thus, when a HDTV video signal is received by the apparatus embodying this invention for reproduction or display by an NTSC or other conventional standard television monitor receiver, the joy stick 13A or the remote controller 13B is actuated for varying the read start address between the extremes indicated at a and c on FIGS. 3A and 3C, respectively, while observing the content of the displayed picture so as to permit selection of a read start address at which important video information appearing at the left-hand or right-hand side portion of the picture is included in the actual picture displayed on the screen of the NTSC or other conventional television monitor receiver.

Of course, the present invention is not limited in its application to the display of HDTV video signals on NTSC television monitor receivers, but can be similarly applied to the display of the high definition video signals on television monitor receivers according to the PAL and SECAM systems, respectively. In each of those cases, the television monitor receiver has an aspect ratio different from that of the HDTV system, and the picture conversion apparatus according to the present invention makes it possible to select for actual display on the picture screen of the television monitor receiver that portion of the HDTV picture display which contains the desired video information, while ensuring that the displayed picture will be free of distortion.

Although the embodiment of the present invention described above with reference to FIG. 2 of the drawings employs a single frame memory 6 into which all of the image data corresponding to a frame of the HDTV video signal is written, it is possible in accordance with the present invention to separate the image data into a luminance signal component and a chroma signal component which are written in two respective frame memories from which the reading is controlled in a manner similar to that described above with reference to the single memory 6.

By way of summary, it will be seen that the apparatus according to the present invention defines an effective picture area of a HDTV picture to be displayed on the screen of a television monitor receiver having a different aspect ratio by selecting the position, in the horizontal direction, of the start address at which the HDTV video data stored in the memory 6 is read therefrom for forming the actually displayed picture. Thus, when converting a video signal from one system to another system having a different aspect ratio, the portion or portions of the original picture display to be omitted due to a difference between the aspect ratios can be selectively changed for ensuring that important video information is not lost and, at the same time, avoiding distortion of the portion of the original picture which is displayed.

Although a specific embodiment of the present invention has been described in detail herein with reference to the drawings, it will apparent that the invention is not limited to that precise embodiment, and that various changes and modifications may be effected therein by one skilled in the art without departing from the scope or spirit of the invention as defined in the appended claims.

What is claimed is:

1. An apparatus for converting video signals of a first format, which has a first number of horizontal scanning lines in a field and a picture display of a first aspect ratio, to video signals of a second format, which has a second number of horizontal scanning lines in a field and a picture display of a second aspect ratio, comprising:

means for receiving video signals of said first format;
   analog-to-digital converter means for converting said video signals of said first format to digital video signals;
   memory means having addresses capable of storing at least a complete field of said digital video signals of said first format;
   means for writing said digital video signals constituting at least a complete field of said first format at said addresses of said memory means;
   means for reading from said addresses of said memory means less samples of said digital video signals than have been written in said memory means;
   digital-to-analog converter means for converting the digital video signals read from said memory means into analog video signals of said second format;
   display means receiving said analog video signals from said digital-to-analog converting means for displaying a corresponding picture in said second format; and
   controlling means operable manually by a viewer of said display means for variably determining a start address of said addresses of the memory means read by said means for reading.

2. An apparatus according to claim 1; in which said first and second aspect ratios are each the ratio of the horizontal dimension to the vertical dimension of the respective picture display, and said first aspect ratio is larger than said second aspect ratio so that said start address determines a portion of the picture display of said first aspect ratio which is omitted at least at one side of said picture display of said second aspect ratio.

3. An apparatus according to claim 1; further comprising line number converting means connected between said memory means and said digital-to-analog converter means for converting the number of lines in a field of said digital video signals read from said memory means from said first number to said second number.

4. An apparatus according to claim 1; in which said manual controlling means is in the form of a joy stick.

5. An apparatus according to claim 1, in which each of said first and second aspect ratios is the ratio of the horizontal dimension to the vertical dimension of the respective picture display, and said first aspect ratio is larger than said second aspect ratio.

6. An apparatus according to claim 5; in which said first aspect ratio is 16:9 or 5:3 and said second aspect ratio is 4:3.

7. An apparatus according to claim 6, in which said first format has 1125 horizontal scanning lines in a frame and said second format has 525 horizontal scanning lines in a frame.

8. An apparatus according to claim 7; in which said memory means is a frame memory.

* * * * *